United States Patent
MacNeil et al.

(10) Patent No.: US 10,758,952 B2
(45) Date of Patent: Sep. 1, 2020

(54) PIPE SCARIFYING METHOD AND APPARATUS

(71) Applicant: Mac & Mac Hydrodemolition Inc., Surrey (CA)

(72) Inventors: Gerard J. MacNeil, Surrey (CA); Jesse MacNeil, Surrey (CA); Brett MacNeil, Surrey (CA); Gordon MacNeil, Surrey (CA); Vernon Bose, Surrey (CA)

(73) Assignee: MAC & MAC HYDRODEMOLITION INC., Surrey (CA)

( * ) Notice: Subject to any disclaimer, the term of this patent is extended or adjusted under 35 U.S.C. 154(b) by 79 days.

(21) Appl. No.: 16/110,925

(22) Filed: Aug. 23, 2018

(65) Prior Publication Data
US 2019/0060965 A1 Feb. 28, 2019

Related U.S. Application Data

(60) Provisional application No. 62/550,452, filed on Aug. 25, 2017.

(51) Int. Cl.
| | |
|---|---|
| *B08B 9/04* | (2006.01) |
| *B08B 9/043* | (2006.01) |
| *B08B 9/032* | (2006.01) |
| *F16L 55/165* | (2006.01) |
| *B08B 3/02* | (2006.01) |
| *F16L 101/10* | (2006.01) |

(52) U.S. Cl.
CPC .......... *B08B 9/0433* (2013.01); *B08B 9/0321* (2013.01); *F16L 55/1658* (2013.01); *B08B 3/024* (2013.01); *B08B 2209/032* (2013.01); *B08B 2209/04* (2013.01); *F16L 2101/10* (2013.01)

(58) Field of Classification Search
None
See application file for complete search history.

(56) References Cited

U.S. PATENT DOCUMENTS 3,603,264 A * 9/1971 Von Arx .............. G01M 3/005
104/138.2

FOREIGN PATENT DOCUMENTS

WO  WO199531295  * 11/1995

OTHER PUBLICATIONS

Translation of WO199531295 by Manfred Forster, published Nov. 23, 1995.*

* cited by examiner

*Primary Examiner* — Mikhail Kornakov
*Assistant Examiner* — Ryan L. Coleman
(74) *Attorney, Agent, or Firm* — Stoel Rives LLP

(57) ABSTRACT

An apparatus for hydrodemolishing the inside surfaces of an inclined pipe, particularly suited to contiguous pipe sections with access ports between the sections. The fluid supply hose is fed to the hydrodemolition rig inside the pipe from the same side as the winch that controls the movement of the rig. The rig is moved upstream in a scarifying pass, then downstream in a cleaning pass for each section and re-staged at each access port.

2 Claims, 5 Drawing Sheets

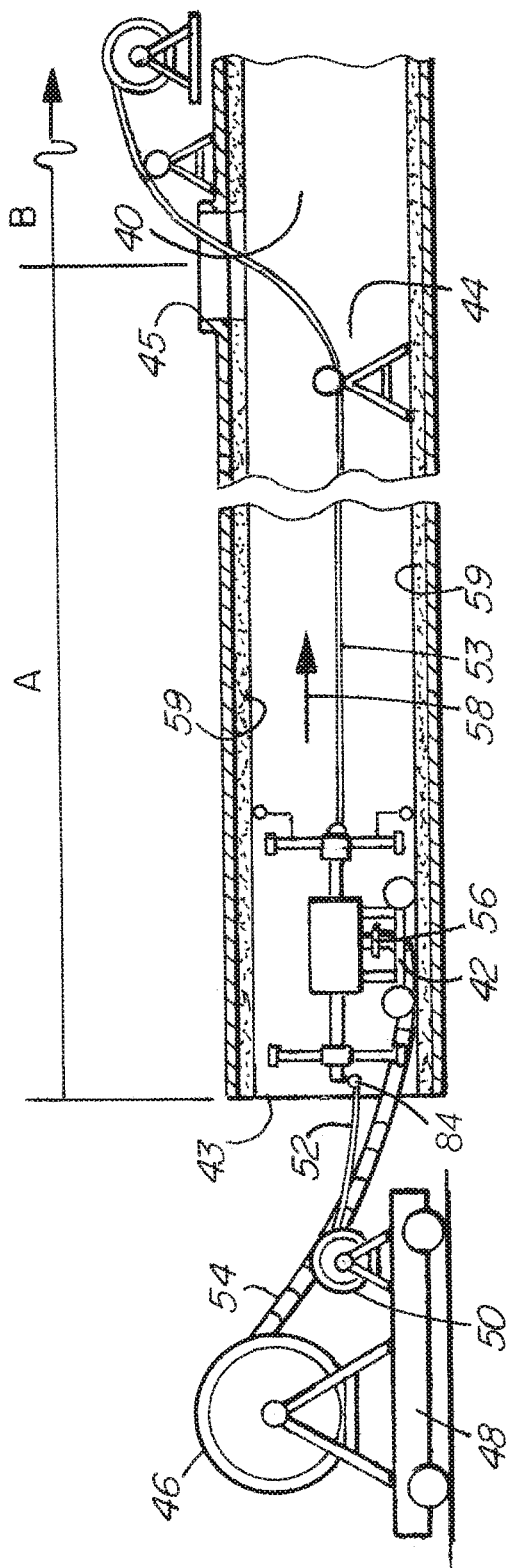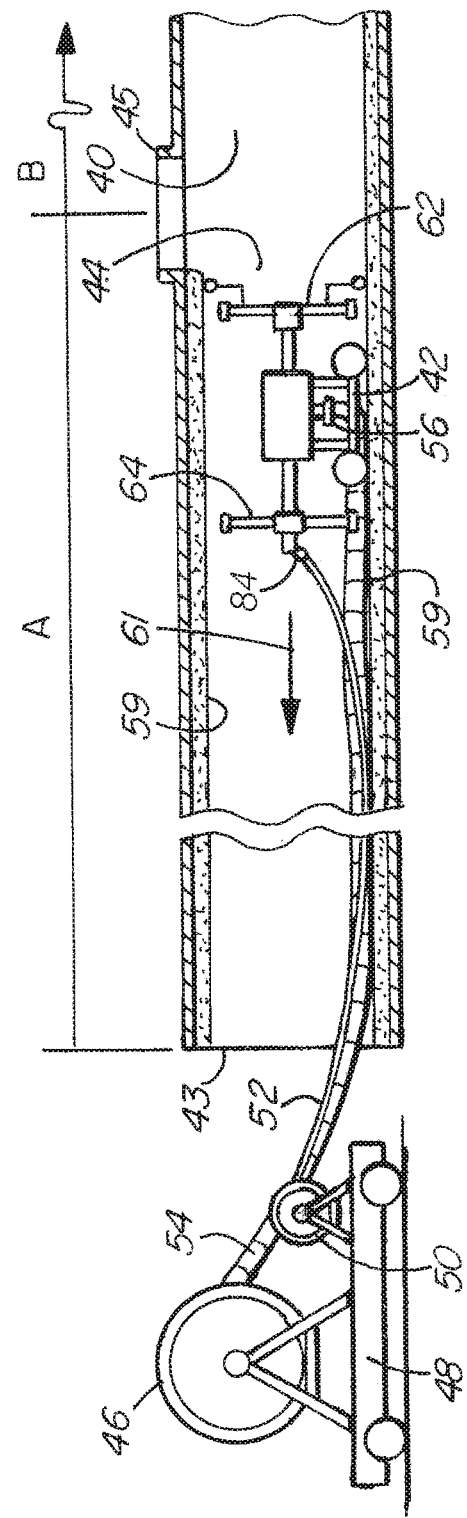

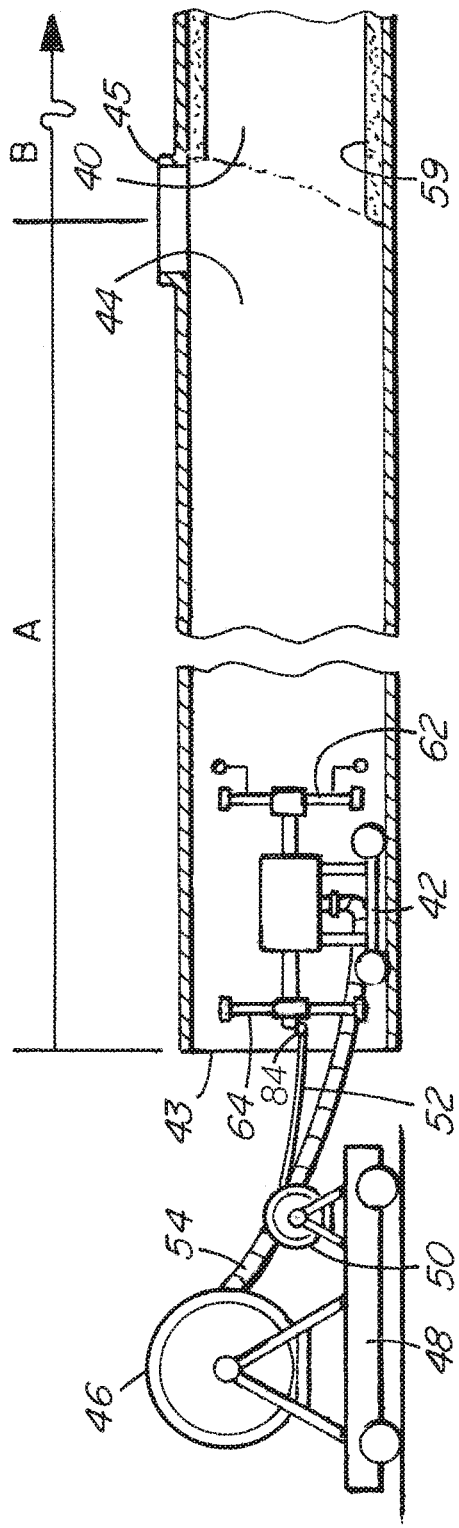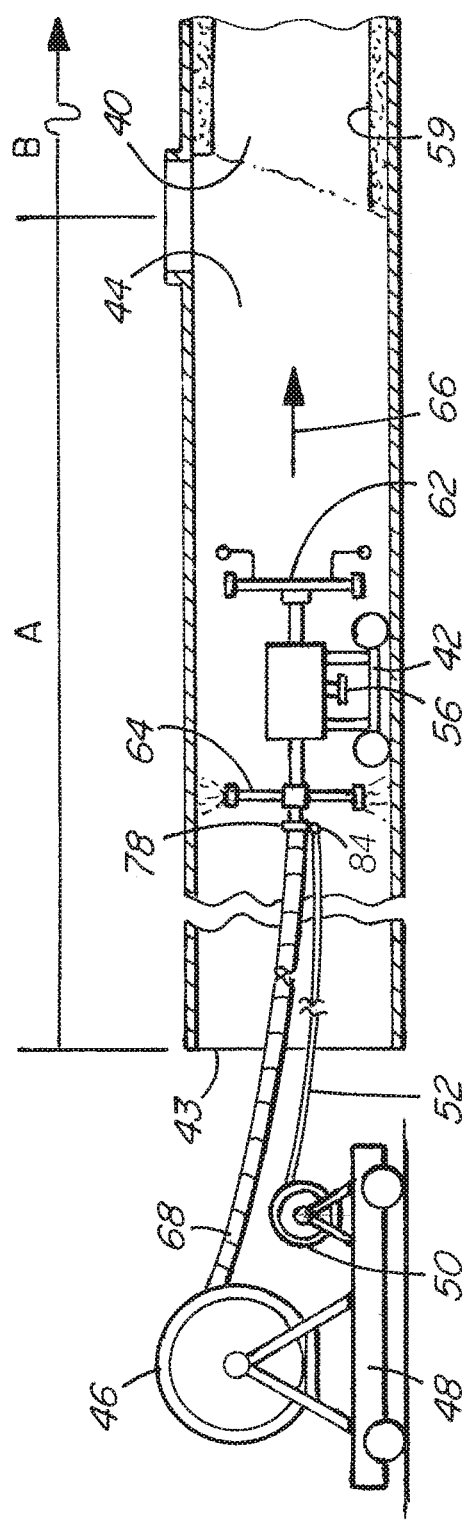

PIPE SCARIFYING METHOD AND APPARATUS

FIELD OF THE INVENTION

This invention relates to the hydrodemolition of the inside surfaces of pipes, sometimes referred to as scarifying.

BACKGROUND OF THE INVENTION

The scarifying of the inside of in situ pipes requires the movement of a hydrodemolition apparatus (hereafter called a "rig"), comprising a high pressure nozzle assembly, along the length of the pipe.

According to a typical prior art approach illustrated in FIG. 1, the rig 10 is attached to a hose 12 supplying high pressure fluid to the rig from the downstream end 14 of the pipe to be treated. The rig is attached to a winch cable 16 that extends from the rig to the upstream end 18 of the pipe, where the winch 20 is located. The winch gradually draws the rig from the downstream end to the upstream end of the pipe in a scarifying pass through the pipe to remove a layer 22, while the rig nozzles 24 are operated to scarify the inside of the pipe. The fluid supply hose 12 is fed from the opposed pump 26 side of the pipe, into the pipe and to the rig from the downstream end of the pipe. As the rig is drawn by the winch, the rig in turn draws the hose into the downstream end of the pipe.

Once the length of hose available on the pump side is exhausted, the hose will resist the forward movement of the rig in the pipe, causing it to stall in one spot while the nozzles are still operating. Once that is detected, the rig is stopped and an additional length of hose is attached to the end of the first length of hose. Movement of the rig can then be restarted to continue treatment of the inside of the pipe. Such stalling of the rig results in a phenomenon sometimes referred to as barbershop striping along the inside of the pipe. Personnel are often positioned inside the pipe to try to manage the hose feed to the rig and to avoid barbershop striping.

It is also known to follow the scarifying pass with a cleaning pass through the pipe using lower pressure fluid and consequently a different nozzle assembly that is swapped out of the rig, or by using a different rig entirely. The cleaning pass is typically accomplished using essentially the same method as for the scarifying pass and prepares the inside of the pipe for further operations such as painting or coating.

Once the pipe has been completely treated, the other operations such as painting or recoating the interior of the pipe can be completed, sometimes by a different crew or a different contractor.

The scarifying pass is performed in some cases by what is known as an ultra-high pressure nozzle assembly, using pressure is in the range of 40,000 psi. The cleaning pass is often performed using lower pressures in the range of 10,000 to 20,000 psi.

The prior art suffers from certain deficiencies. The barbershop striping produces an inconsistent treatment of the inside of the pipe. Personnel are required to assist and monitor the hose attachment to the rig. In addition, the treatment process, including two passes through the pipe, is time consuming. When other contractors await access to the pipe on a usually tight timeline, processing time must be minimized. This becomes inconvenient when dealing with particularly long sections of pipe that may take many days or weeks to complete, if they may be accomplished at all using the prior art approaches. Where a long length of pipe is involved, the drawing of the hose into the pipe by drawing the rig attached to the hose can become particularly challenging, requiring very powerful winches.

In an alternative prior art approach, the rig may be installed at one end of the pipe and may be towed by the hose itself which is drawn to a hose reel by a winch. However, this method of towing the rig tends to cause the rig to jerk inconsistently.

Another known approach is to have a tractor-driven rig inside the pipe. The rig progresses down the pipe while scarifying it, with the hose trailing the rig. Typically personnel are present in the pipe to periodically pull the hose in behind the rig. Alternatively the rig may be equipped with a winch to draw the hose behind it. In such case, personnel is still required in the pipe to ensure that the connection of the hose to the rig is not compromised by the tension on the hose, and to avoid the hose causing the rig to stall.

The invention provides an apparatus and the method that represent an improvement over the prior art. The scarifying of the inside of the pipe is accomplished more efficiently and more quickly to free up access to the treated section of pipe and the need for in-pipe personnel to deal with the hose is avoided.

SUMMARY OF THE INVENTION

The present invention finds its most useful application where a long pipe needs to be treated in successive sections. This may be the case for example where access ports are provided at intervals along the pipe. The access ports are designed for general maintenance of the pipes, but in the context of the invention may be used to define pipe sections to be treated successively by providing an opportunity to periodically reinitialize the hydrodemolition operation, using the access ports as staging areas to reconfigure the rig, the hose and the winches.

According to an embodiment of the invention, the hose for supplying high pressure fluid is fed to the rig from the same end of the pipe as the winch. The starting configuration is to place the rig at a downstream end of the pipe section to be treated. A winch cable is attached to the rig and extends through the pipe section to the opposite, upstream end of the pipe section where it is attached to a winch. The fluid supply hose is also attached to the rig and extends through the pipe section to the upstream end, where it is attached to a powered hose reel.

In operation, the winch draws the rig through the pipe while the reel motor reels the hose in at the same time. The speeds of the winch and of the hose reel are closely coordinated to ensure that the hose is withdrawn from the pipe at the same rate as the rig.

As the rig is drawn from the downstream end to the upstream end in a scarifying pass, a nozzle assembly on the rig is operated to scarify the inside of the pipe section. Preferably the scarifying pass through the pipe section is performed using ultra high-pressure nozzles (in the range of 40,000 psi). The ultra-high pressure nozzle assembly is preferably located on the downstream side of the rig.

Once the rig reaches the upstream end of the pipe section such that the entire section has been scarified, the ultra-high pressure hose is disconnected from the rig and a high pressure hose used for a cleaning is attached to the rig. The rig and its attached hose are then migrated back through the same pipe section from the upstream end to the downstream end. During the return pass, cleaning nozzles on the rig are operated to clean the inside of the pipe section from the upstream end to the downstream end. Preferably high pressure nozzles in the range of 10,000 to 20,000 psi are used for that "cleaning" pass. The high pressure nozzle assembly is mounted on the upstream end of the rig.

As a result of the foregoing process, where the pipe comprises a number of contiguous sections to be treated, the rig ends up adjacent to the next contiguous section of pipe to be treated. Where this coincides with a pipe access port, it enables the re-staging of the system for the following section of pipe to be treated.

Using the access port, the winch cable and the hose are disconnected from the rig, then each is drawn out of the pipe through the first, already treated, section. The winch and the hose reel are then moved to the access port adjacent to the next section of pipe to be treated (where the rig is now located). The winch cable and an ultra-high pressure hose are attached through the access port to the rig. The rig is migrated down the second pipe section to a new starting point and the above process is performed for that new section. As the rig is operated in that section, the hose and the winch cable are fed through, or drawn from, as the case may be, the access port.

While the method of the invention is applicable to any pipe section, it is particularly convenient where the pipe section is at an incline. In that case, the rig, including the winch cable and the hose attached to the rig, may be migrated down the pipe section by gravity. Where gravity assistance is not available, the rig and its attached winch cable and hose may be drawn through the pipe section to the downstream end by an additional winch cable extended through the pipe section from the downstream end. The second winch cable is then used to draw the rig through the pipe section to the downstream end to being the scarifying pass. The same second winch cable is also used to later return the rig to the same downstream end of the section during the cleaning pass through the pipe section.

By providing both an ultra-high pressure scarifying nozzle assembly and a high pressure cleaning nozzle assembly on the same rig, a synergy is achieved using the method of the invention. While the rig is migrated back to the downstream end of the pipe section, so as to be near the next section of pipe to be treated, the high pressure cleaning nozzles are actuated. As a result, as the rig is being migrated back to the staging point for the next section of pipe, the system also performs the second or cleaning step of the treatment.

The inventors have found that a conventional hydraulic hose reel motor does not provide sufficiently precise control to track the speed of the rig in the pipe. Accordingly, an electric motor is used to power the hose reel.

The scarifying and cleaning nozzles are preferably angled slightly toward the downstream end of the pipe section in order to propel any debris and fluid downstream towards the downstream end of the pipe.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 4 shows an embodiment of a method according to the invention involving two winches;

FIG. 5 is a side elevation of the rig at a downstream end of a section of pipe prior to commencing a scarifying pass;

FIG. 6 is a side elevation of a pipe section with the rig at the upstream end of the section;

FIG. 7 is a side elevation showing a rig part way through a cleaning pass moving downstream of the pipe;

DETAILED DESCRIPTION OF THE PREFERRED EMBODIMENT

Figure 1:
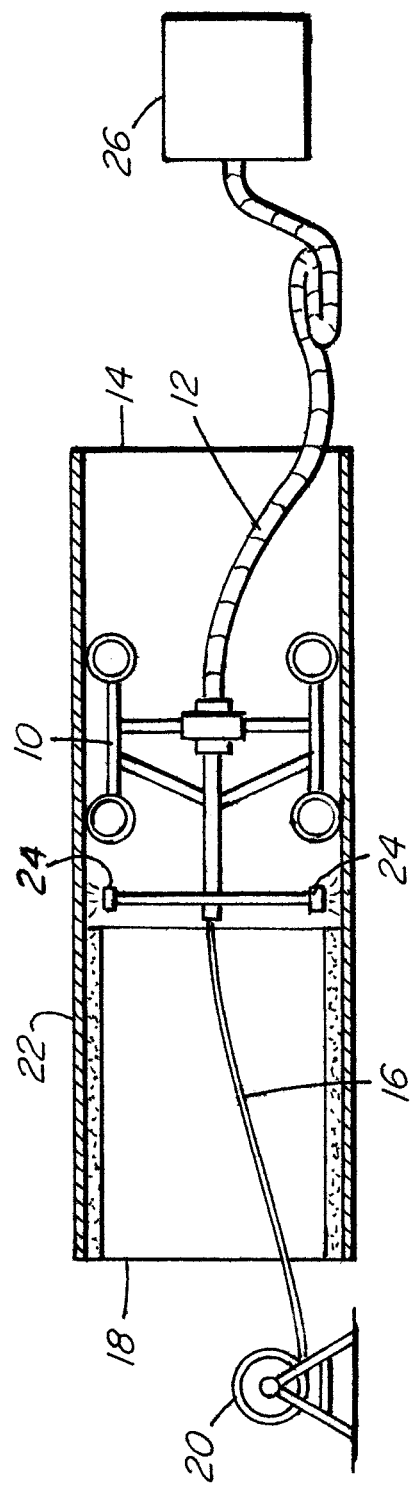
FIG. 1 is a side elevation showing a prior art approach two pipes scarifying.

The rig according to an embodiment of the invention includes at one end of the rig an ultra-high pressure nozzle assembly for the scarifying pass and a high pressure nozzle assembly for the cleaning pass, the latter being located at the opposite end of the rig. Each nozzle assembly includes an axial hub and nozzle arms extending radially from the hub. Each nozzle arm terminates in a nozzle. The hub is rotatable about a longitudinal axis of the rig so that the nozzles may treat a circumferential swath of the pipe section.

The ultra-high pressure nozzles are maintained at a close but controlled spacing from the inner surface of the pipe by means of rollers 57 attached to the nozzle arms. The nozzle arms are also adapted to retract toward the hub by means of hydraulic cylinders. The hydraulic pressure is adjusted so that in the event that the nozzles inadvertently enter into contact with an obstruction or with the inner surface of the pipe, the arm can relatively easily yield and retract. The retractable arms also facilitate the maintenance or replacement of the nozzles and the removability of the rig through an access port.

The ultra-high pressure nozzles are further mounted on the ends of the nozzle arms using an articulation system enabling the nozzles to conically rotate about the end of the nozzle arm. The scarifying and cleaning nozzle assemblies include selected non-rotating nozzles that are angled slightly off the radial axis toward the tangential direction to propel the nozzle assemblies to rotate about the hub.

Speed sensors are mounted on the rig to track the progress of the rig through the pipe and to enable close tracking and coordination of the speed of the hose retraction by the powered hose reel. Forward and rearward cameras are mounted on the rig to enable the remote detection of obstructions and to monitor the treatment of the pipe surface. If the treatment is inadequate, the speed of the rig may be slowed down to enable more complete scarifying, or cleaning, as the case may be.

The rig includes a fluid inlet for connecting the ultra-high pressure supply hose. That inlet is on the inboard side of the ultra-high pressure nozzle assembly. While the rig is performing the scarifying pass, the ultra-high nozzles assembly is on the downstream end of the rig, while the hose extends from the inboard inlet to the nozzle assembly, through the frame of the rig and past the cleaning nozzle assembly (which is not operated during the scarifying pass).

The high pressure cleaning nozzle assembly is located on the upstream side of the rig. A fluid inlet for the high pressure cleaning hose is preferably located in the middle of the hub on which the high pressure cleaning nozzle arms are located. The body of the hub rotates around the inlet. With that arrangement, the high pressure hose does not interfere with the spinning of the cleaning nozzles as the hose extends upstream of the rig.

The winch is mounted on the same trailer that also carries the powered hose reel.

Figure 2:
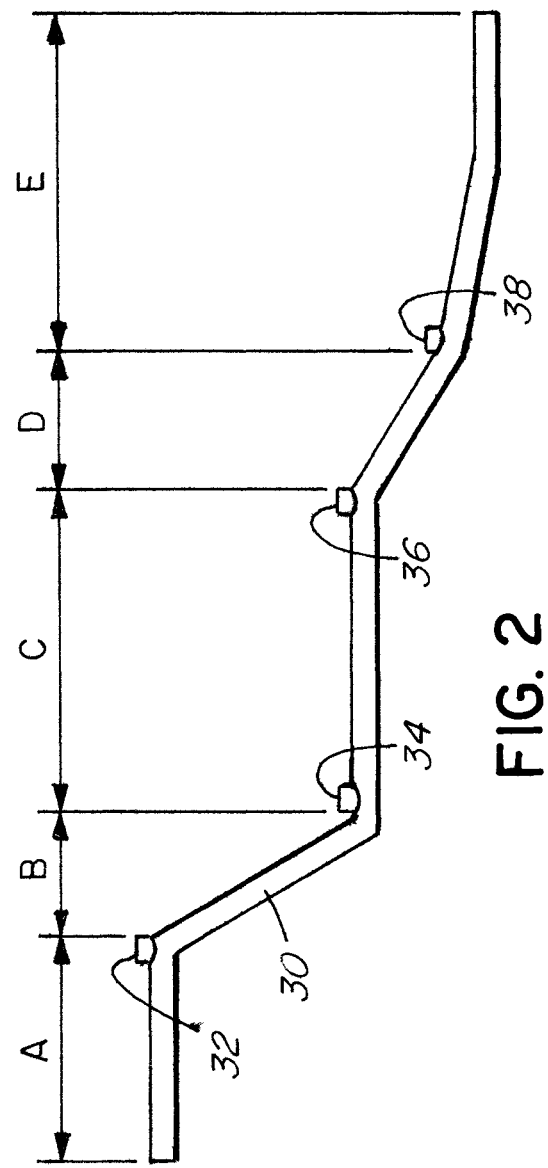
FIG. 2 is a side elevation of an exemplary length of pipe to be treated.

FIG. 2 illustrates an exemplary length of pipe 30 to be treated. In the illustrated example, the pipe is a penstock pipe and overall length of pipe to be treated is 2500 feet. Access ports 32-38 are provided at intervals along the pipe, for example, about every 600 feet. The access ports are used to conveniently define the pipe sections A-E. The access ports may be specifically created along the pipe to facilitate the hydrodemolition operation. The access ports may be approximately 2 feet in diameter. It may be contemplated, according to the invention, to treat each of contiguous pipe sections A, B, C, D and E as individual processing stages.

Figure 3:
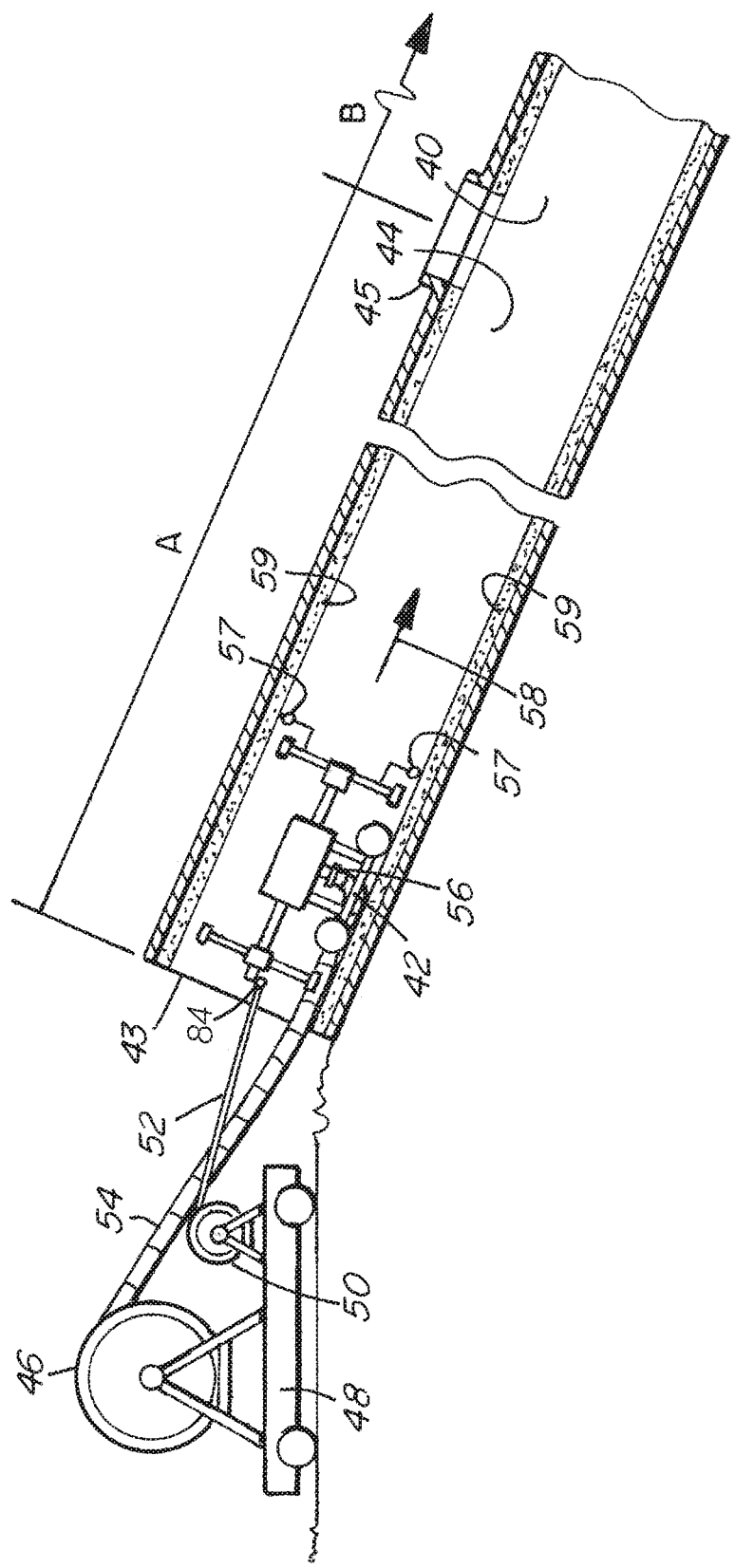
FIG. 3 is a longitudinal cross-sectional view of a pipe section to be treated according to the method in using the apparatus of the invention.

FIG. 3 is a longitudinal cross-sectional view of a pipe section A to be treated according to the method and using the apparatus of the invention. Section A is shown as being on an incline. Also visible is the upstream end 40 of the contiguous pipe section B, also at an incline. Access port 45 defines the transition between sections A and B. The hydrodemolition rig 42 is shown at the initial staging position at the upstream end 43 of section A. A powered hose reel 46 is mounted on a trailer 48. A winch 50 is mounted on the same trailer. The winch cable 52 is attached to the frame of the rig and the hose 54 is attached to the ultra-high pressure fluid inlet 56 of the rig.

The first step in the method is to migrate the rig and the attached winch cable and hose to the downstream end 44 of section A, in the direction of arrow 58. Where an incline as shown in FIG. 3 exists, the rig may be migrated to the downstream end 44 by gravity, taking advantage of the incline of the pipe section. The speed of the hose reel 46 is controlled to track the rate of the descent of the rig along pipe section A. In the absence of any incline, a second winch cable 53 is attached to the rig from the end of the pipe section to draw the rig 42, the hose 54 and the winch cable 52 from the upstream end 43 to the downstream end 44 of the section A, as shown in FIG. 4. The second winch cable may be fed into the pipe through an access port 45.

FIG. 5 shows the rig at the downstream end of section A, prior to commencing the scarifying pass. In FIG. 5, for ease of drawing and simplicity, sections A and B are shown without the incline. In order to perform the scarifying pass of section A, the winch 50 draws the rig 42 from the downstream end 44 to the upstream end 43 of section A in the direction of arrow 61. At the same time the powered hose reel 46 draws the hose 54 back onto the reel. During the scarifying pass, the ultra-high pressure nozzle assembly 62 is operated by the ultra-high pressure fluid supply while the cleaning nozzle assembly 64 is not actuated, as it is not connected to any fluid supply.

The scarifying pass results in scarifying of the pipe section along the length of section A to remove a layer 59. The rig ends up at the upstream end 43 of section A with the hose 54 substantially reeled in, but with layer 59 removed from the pipe section as shown in FIG. 6.

The ultra-high pressure hose 54 is disconnected from inlet 56. A high pressure (rather than an ultra-high pressure) supply hose 68, preferably housed on the same hose reel 46, is connected to the nose hub inlet 78 at the upstream side of the cleaning nozzle assembly 64. The cleaning pass is then initiated by migrating the rig 42 back down the length of section A, in the direction shown by arrow 66. FIG. 7 shows the rig part way through the cleaning pass moving downstream of the pipe. If gravity is not available to move the rig downstream, a second winch cable is used, being fed from the downstream end of the pipe section through access port 45 as was suggested by FIG. 4. Migration of the rig downstream of the pipe continues until the rig reaches the access port 45, i.e. the downstream end 44 of section A and the upstream end 40 of section B.

Once the rig has completed the downsteam cleaning pass and is located adjacent the access port 45, the access port 45 is then used to gain access to the rig to disconnect the high pressure hose 68 and the winch cable 52, both of which are then drawn back to the hose reel 46 and to the winch 50 respectively. The trailer 48 carrying the hose reel and the winch is then brought to the access port 45 at which point the winch cable 52 and the ultra-high pressure hose 54 are reconnected to the rig through the access port. The rig is then ready to be migrated from the upstream end 40 of section B to the downstream end of section B, essentially repeating the operation described above but for section B. This process may continue through an indefinite number of pipe sections, using the access ports to stage the operation for each new section of pipe.

It is expected that a given section can be treated using the approach and apparatus of the invention in about half the time it would take according to the prior art.

Figure 8:
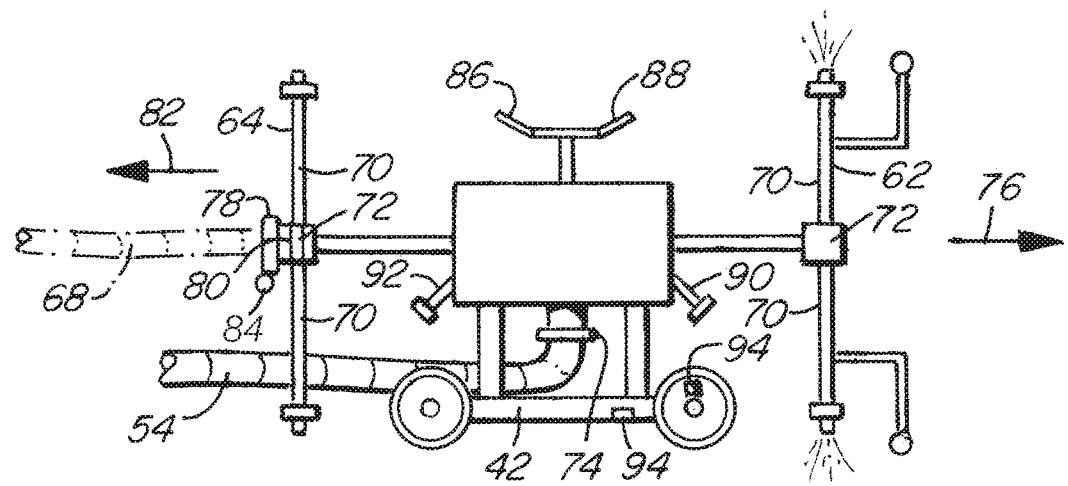
FIG. 8 is a side view of a rig according to an embodiment of the invention.

FIG. 8 shows of the apparatus according to an embodiment of the invention. An ultra-high pressure nozzle assembly 62 is provided at a first end of the rig and a high-pressure nozzle assembly 64 is provided at opposed end of the rig. Each assembly comprises nozzle arms 70 extending radially from a rotatable hub 72. A regulator is provided in the rig to regulate the speed of rotation of the nozzle arms 70. As is known, some of the nozzle arms carry a plurality of ultra-high pressure nozzles that are mounted in a rotatable housing at the end of the nozzle arm to allow them to rotate in an arc about the end of the nozzle arm. As a result, as the rig progresses, a circular swath of high-pressure fluid is directed to the surface of the pipe so that as the nozzle arms rotate about the hub, a circumferential swath about the pipe is treated.

Figure 9:
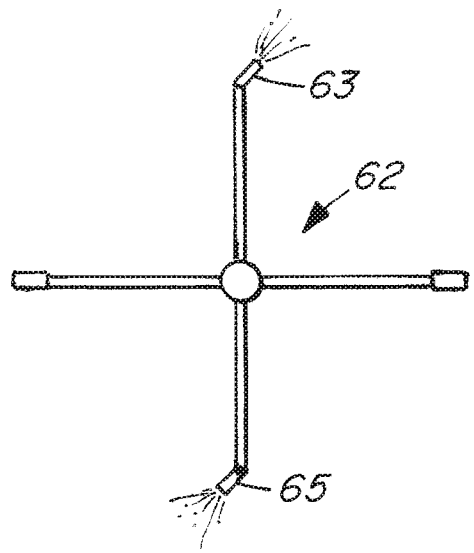
FIG. 9 is a front view of an ultra-high pressure nozzle assembly according to an embodiment of the invention.

FIG. 9 is a front view of the ultra-high pressure nozzle assembly 62. Selected ones 63, 65 of the nozzles are oriented slightly toward the tangential direction of the pipe in order to propel the radial arms to rotate about the hub. This avoids the need for powered actuation of the nozzle assembly.

The rig includes an inboard ultra-high pressure hose inlet 74 for supplying the ultra-high pressure nozzle assembly 62. Since the rig will be moving in the direction shown by arrow 76 when an ultra-high pressure hose is attached to the inlet 74, the only nozzle assembly that will be operating and rotating will be the ultra-high nozzle assembly 62, while the high pressure nozzle assembly 64 will be stationary. As a result, the ultra-high pressure hose 54 may be threaded between the stationary nozzle arms of the high pressure nozzle assembly 64.

The high pressure hose inlet 78 is provided on the outboard side of the rig on the nose 80 of the hub 72. Hub 72 rotates around the stationary nose 80. By means of this arrangement, when the rig is travelling in the direction of arrow 82 the high pressure hose 68 does not interfere with the rotation of the high pressure nozzle assembly 64. A hook 84 is provided for attaching the winch cable that attaches to the upstream end of the rig 42.

As no personnel are contemplated in the pipe during the scarifying or cleaning operations, cameras 86, 88, 90 and 92 are provided to allow remote viewing of the operations. Speed sensors 94 are also provided to enable accurate tracking by the powered hose reel of the speed of the rig 42.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A method for hydrodemolition of the inside of an inclined pipe section comprising:
    a. installing a rig within a downstream portion of said pipe section, said rig comprising a nozzle assembly, wherein said nozzle assembly comprises a first nozzle assembly configured to be supplied with water from a first inlet of the rig and a second nozzle assembly configured to be supplied with water from a second inlet of the rig;
    b. attaching a winch cable to said rig, said cable extending within said pipe section from an upstream portion of said pipe section to said rig;
    c. extending a first water hose from a hose reel at said upstream portion to said rig, wherein said first water hose is connected to said first inlet of said rig;
    d. using a winch to draw said rig upstream through said pipe section at a first speed while simultaneously reeling in said first hose on said hose reel at a second speed that is substantially equal to the first speed, while said first nozzle assembly operates to hydrodemolish the inside of said pipe section, until said rig reaches said upstream portion;
    e. disconnecting said first hose from said rig and attaching a second hose to said second inlet of said rig;
    f. migrating said rig within said pipe section from said upstream portion to said downstream portion while said nozzle assembly cleans the inside of said pipe section.

2. A method for hydrodemolition of the inside of an inclined pipe comprising contiguous sections, comprising
    a. installing a rig within a downstream portion of a first pipe section and adjacent a pipe access port, said rig comprising a nozzle assembly, wherein said nozzle assembly comprises a first nozzle assembly for supplying water and a second nozzle assembly for supplying water;
    b. attaching a winch cable to said rig, said cable extending within said first pipe section from an upstream portion of said first pipe section to said rig;
    c. extending a first water hose from a hose reel at said upstream portion to said rig, wherein said first water hose supplies water to said first nozzle assembly;
    d. using a winch to draw said rig upstream through said first pipe section while simultaneously reeling in said first hose on said hose reel, and while said first nozzle assembly operates to hydrodemolish the inside of said first pipe section, until said rig reaches said upstream portion;
    e. disconnecting said first hose from said rig and attaching a second hose to said rig for supplying water to said second nozzle assembly;
    f. migrating said rig within said first pipe section from said upstream portion to said downstream portion while said second nozzle assembly cleans the inside of said first pipe section;
    g. accessing said rig through a pipe access port to disconnect said winch cable and said second hose from said rig;
    h. drawing said winch cable and said second hose upstream to said upstream portion and out of said first pipe section;
    i. introducing said winch cable and said first hose through a pipe access port and attaching said winch cable and said first hose to said rig;
    j. migrating said rig downstream to a downstream position of a second pipe section, said second pipe section being contiguous to and downstream of said first pipe section;
    k. using said winch to draw said rig upstream from said downstream position of the second pipe section through said second pipe section while simultaneously reeling in said hose on said hose reel, and while said nozzle assembly operates to hydrodemolish the inside of said second pipe section, until said rig reaches an upstream portion of said second pipe section; and,
    l. migrating said rig within said second pipe section from said upstream portion of said second pipe section to said downstream position of the second pipe section while said nozzle assembly cleans the inside of said second pipe section.

\* \* \* \* \*